United States Patent

Matsuoka et al.

[11] 4,027,906
[45] June 7, 1977

[54] KNEE PROTECTOR

[76] Inventors: Hideoki Matsuoka, No. 143, Kanazawa-cho, Kanazawa, Yokohama; Hiroshi Tsuda, No. 3-5-20, Nakahara, Isogo, Yokohama, both of Japan

[22] Filed: June 4, 1975

[21] Appl. No.: 583,916

[30] Foreign Application Priority Data

June 8, 1974 Japan .......................... 49-66545[U]
June 15, 1974 Japan .......................... 49-70030[U]

[52] U.S. Cl. ............................... 280/751; 297/390
[51] Int. Cl.² ........................................ B60R 21/00
[58] Field of Search ......... 280/150 B, 150 SB, 748, 280/751, 744, 746; 297/385, 390

[56] References Cited

UNITED STATES PATENTS

| 2,695,792 | 11/1954 | Rumsey | 280/150 B |
| 3,262,716 | 7/1966 | Graham | 280/150 B |
| 3,840,248 | 10/1974 | Fiala | 280/150 SB |

FOREIGN PATENTS OR APPLICATIONS 1,903,055  8/1970  Germany ................... 280/150 SB Primary Examiner—Joseph F. Peters, Jr.
Assistant Examiner—Michael J. Forman
Attorney, Agent, or Firm—Depaoli & O'Brien

[57] ABSTRACT

A motor vehicle provided at the foot space with an elongated belt, as a knee protector. The elongated belt has one end secured to the vehicle side panel and a pretension device, fixed to the tunnel projection, anchors the opposite end of the elongated belt to apply a predetermined tension on the belt. The belt is provided with at least two longitudinally extensible folds which are disposed on the opposite sides from the impact receiving zone on the belt. Each longitudinally extensible fold has superposed layers which are interconnected by stitches that are breakable, thereby absorbing the impact energy applied by the occupant's knees on the impact receiving zone.

9 Claims, 11 Drawing Figures

FIG. 9
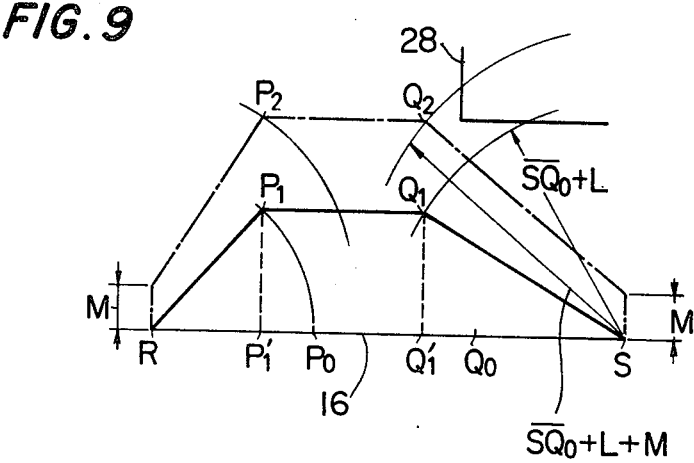
FIG. 10
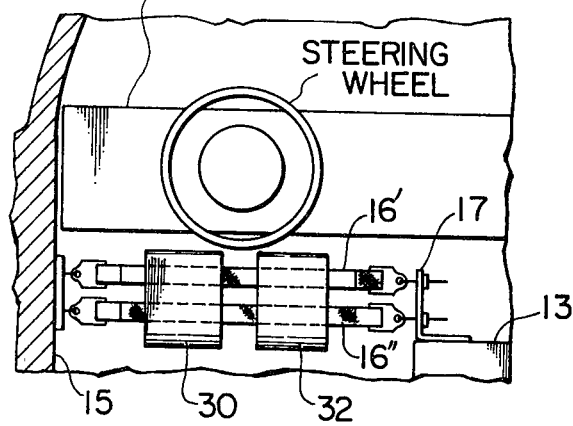
FIG. 11

KNEE PROTECTOR

The present invention relates to vehicle safety devices, and more particularly to a knee protector, in a vehicle having a seat, for an occupant of the seat.

Conventionally various vehicle safety devices are proposed, a typical one of them being a gas bag or an inflatable cushion. The object of such gas bags or cushions is to restrict the displacement of the torso of an occupant with respect to his seated position during a frontal collision of the vehicle.

Crash studies have indicated that a secondary problem results when the occupant has such gas bag restraint. If the crash is severe the occupant may then "submarine" under the gas bag in a forward direction.

It has been found that by anchoring a knee protector in the vehicle foot space the tendency for submarining will be substantially reduced. Various knee protectors for the above purpose are now proposed, none of them being satisfactory however.

There is provided in accordance with the present invention a knee protector, in a vehicle having a seat, for an occupant of the seat comprising: an elongated belt anchored in the vehicle foot space, said elongated belt being provided with at least one longitudinally extensible fold having superposed layers which are interconnected by breakable stitches and means for straining said elongated belt with a predetermined tension.

In a first preferred embodiment of the knee protector in accordance with the present invention an elongated belt anchored in the vehicle foot space has one end attached to a first fixed portion of the vehicle and its opposite end attached to a second fixed portion which is transversely spaced from the first fixed portion with respect to the longitudinal direction of the vehicle and is provided with an impact receiving zone between the first and second fixed portions and with two longitudinally extensible folds, each having superposed layers which are interconnected by breakable stitches, the folds being longitudinally spaced equidistant on the opposite sides from the impact receiving zone and means for straining the elongated belt with a predetermined tension.

The result achieved by this preferred embodiment is that, upon application of an impact force by the knees of an occupant of the seat during frontal collision of the vehicle on the impact receiving zone, the stitches break thereby to absorb the impact force and to permit the elongated belt to elongate from an initial length toward a final length at a controlled rate in such a manner that the knees are controlled to move in a forward direction parallel to the longitudinal direction of the vehicle.

In a second preferred embodiment of the knee protector according to the present invention, the elongated belt is further provided with a second longitudinally extensible fold having superposed layers which are interconnected by breakable stitches, which are more easily breakable than the stitches of the first folds, the second fold being disposed in a position between the impact receiving zone and one of the two first mentioned longitudinally extensible folds, such that upon application of an impact force by the knees of the occupant during frontal collision of the vehicle on the impact receiving zone, the second fold unfolds before the two first mentioned folds unfold to deflect a direction of movement of the knees from the forward longitudinal direction of the vehicle.

The result achieved by providing the second longitudinally fold is that during frontal collision of the vehicle the knees are prevented from hitting against an obstacle disposed forwardly of the elongated belt and on the adjacent side of the one of two first longitudinally extensible folds.

The present invention will now be further described with reference to the accompanying drawings, which are merely illustrative and not intended to limit the invention in any way, and in which:

FIG. 9 is a view explaining the operation of the knee protector shown in FIGS. 7 and 8;

FIG. 10 is a similar view to FIG. 1 illustrating a modification of the knee protector shown in FIG. 1; and FIG. 11 is a perspective view of the knee protector shown in FIG. 10.

Figure 1:
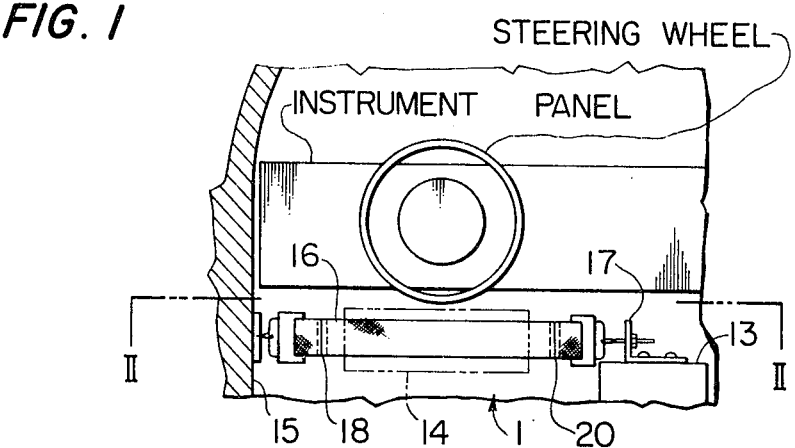
FIG. 1 is a transverse sectional view of a part of a passenger car as viewed in the forward longitudinal direction illustrating a first embodiment of a knee protector in accordance with the present invention.
Figure 2:
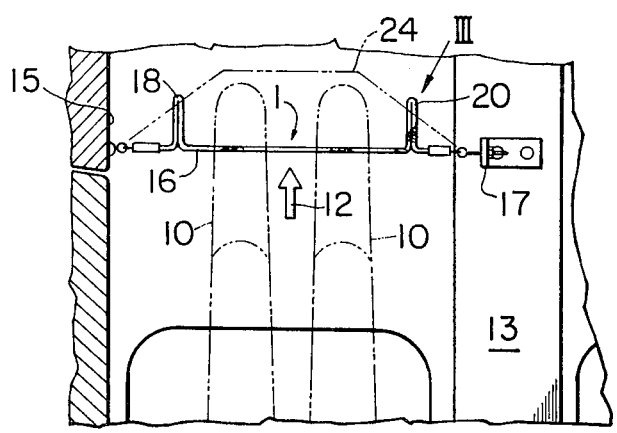
FIG. 2 is a cross-sectional view taken along line II—II of FIG. 1.

Referring now to the accompanying drawings wherein like reference numerals are used throughout various views to designate like parts, and more particularly to FIG. 2, the direction of an impact force applied to a knee protector 1 by the knees of vehicle occupant's legs 10 during a frontal crash or collision of the vehicle is indicated by a large arrow 12. The occupant's knees thereby impinge on an impact receiving zone 14 (see FIG. 1 also) of an elongated belt 16 anchored in the vehicle foot space. The elongated belt 16 is one of the essential elements of the knee protector 1.

Figure 3:
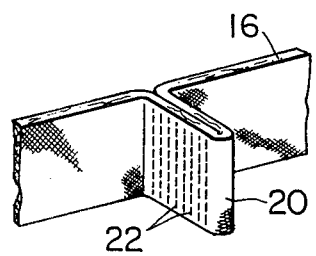
FIG. 3 is an enlarged perspective view of a part of the knee protector taken in the direction of an arrow III in FIG. 2.

Referring also to FIGS. 1 and 3, the belt 16 has one end attached to an interior side panel 15 of the vehicle and its opposite end attached to a tunnel projection 13 through a pretension device 17 to extend transversely with respect to the longitudinal direction of the vehicle in such a manner that the impact receiving zone 14 assumes a position in front of the occupant's knees. The pretension device 17 is of a conventional type including an adjustable screw and a nut and with the pretension device 17 the belt 16 is strained with a predetermined tension.

The belt 16 is provided with two longitudinally extensible folds 18 and 20. As best seen in FIG. 3 each of the longitudinally extensible folds 18 and 20 has two superposed layers which are interconnected by breakable stitches 22. The stitches 22 are breakable under a tension force exceeding a predetermined value and tending to unfold the fold 20, thereby absorbing the tension force.

The two folds 18 and 20 are longitudinally spaced equidistant on the opposite sides from the impact receiving zone 14, as best seen in FIG. 1, and commence to part or unfold when an impact force exceeding a predetermined value is applied by the occupant's knees to the impact receiving zone 14 in the direction indicated by the arrow 12 and permit the belt 16 to elongate from an initial length toward a final length, indicated by dash and dot lines 24 in FIG. 2, at a controlled rate in such a manner that the occupant's knees are controlled to move or displace in the longitudinal direction of the vehicle. The impact force is thereby absorbed during this elongation.

Figure 4:
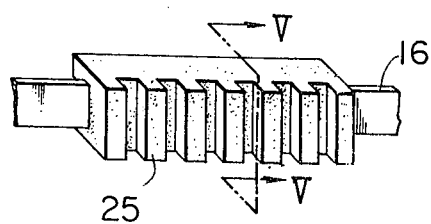
FIG. 4 is a perspective view of one example of a padding means as carried at impact receiving zone of the elongated belt of the knee protector.
Figure 5:
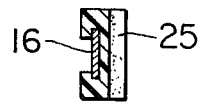
FIG. 5 is a cross-sectional view taken along V—V of FIG. 4.

Preferably the impact receiving zone 14 of the elongated belt 16 is covered with a padding (see FIG. 4) having a foamed material. The padding 25 is anchored to the belt 16 as shown in FIG. 5.

The material forming the elongated belt 16 should be a fiber having appropriate strength and elasticity. The fiber forming the belt 16 may be made of a natural yarn, such as a hard and bast yarn or a cotton yarn, or of an artificial yarn, such as a nylon yarn or a polyester yarn, or of a mixed or blended one of more than two kinds of the above-mentioned yarns. Blending the fiber with a minor amount of rubber alleviates the shock on the occupant's knees upon the impact of the knees on the belt 16.

The dimension of an elongated belt, if it is used alone in a knee protector, should be determined after taking the following factors into consideration. The width of the belt should be a value falling in the range between 50 and 300 mm because with the belt having its width narrower than 50 mm, the belt might not receive the occupant's knees during a vehicle collision if the physique of the occupant is relatively big and the seated position of the occupant is bad, and because with the belt having the width wider than 300 mm, a driver would feel difficulty in operating the foot pedals since the belt almost occupies the foot space if the belt is anchored in the foot space of the driver's seat.

Figure 6:
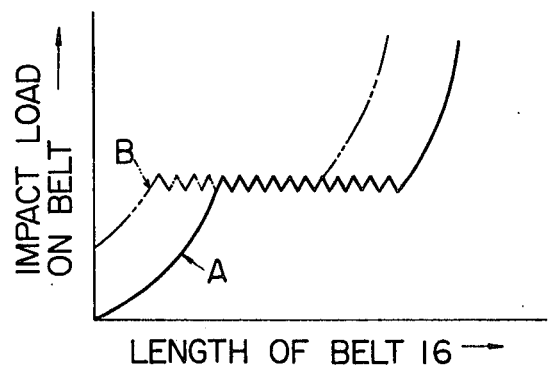
FIG. 6 is a graph showing the load versus extension relation.

The graph shown in FIG. 6 illustrates the load versus length relation of the elongated belt 16, in which curve A shows characteristic of the knee protector 1 without a tension on the belt 16 and curve B characteristic of the knee protector with a predetermined tension on the elongated belt 16. It will be understood from the comparison of the curves A and B with application of the predetermined tension on the elongated belt by the pretension device 17, the same amount of impact energy can be absorbed with less space. This permits the designer to arrange the knee protector in most appropriate location in the vehicle foot space.

Figure 7:
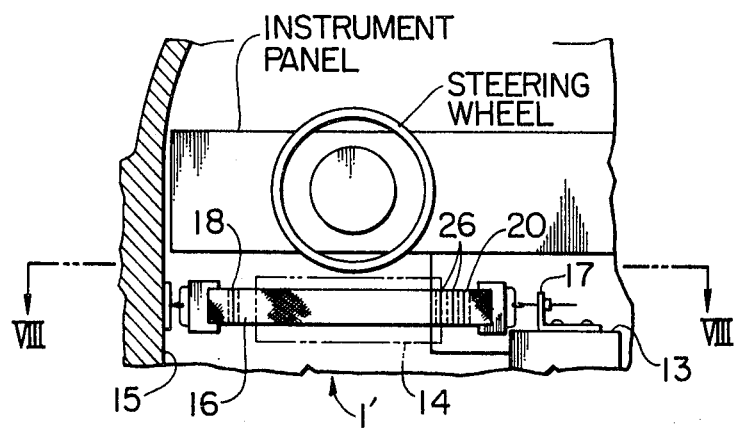
FIG. 7 is a similar view to FIG. 1 illustrating a second embodiment of the knee protector in accordance with the present invention.
Figure 8:
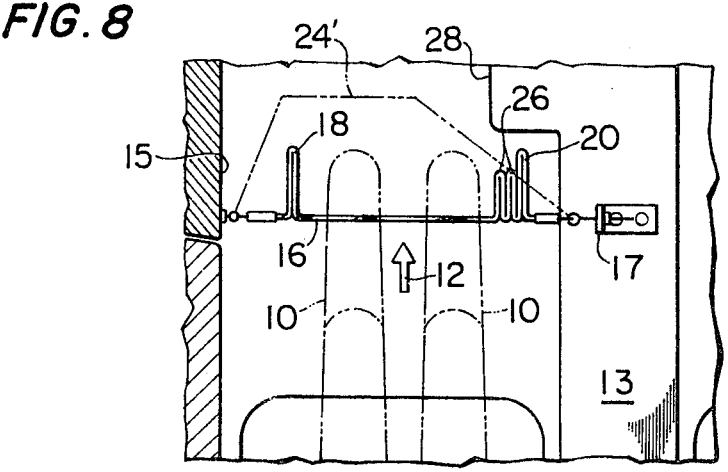
FIG. 8 is a cross-sectional view taken along line VIII—VIII of FIG. 7.

Referring now to FIGS. 7, 8 and 9, a second embodiment of a knee protector 1' of the present invention is illustrated, in which the direction of the impact force applied to the knee protector by the knees of vehicle occupant's legs during a frontal collision of the vehicle is now indicated by a large arrow 12. In the second embodiment like parts to the embodiment shown in FIGS. 1 through 6 are designated by like reference numerals.

Similarly to the knee protector shown in FIGS. 1 and 2, the knee protector 1' comprises an elongated belt 16 having one end attached to an interior side panel 15 of the vehicle and its opposite end attached to a tunnel projection 13 through a pretension device 17. The elongated belt 16 extends transversely with respect to the longitudinal direction of the vehicle in such a manner that an impact receiving zone 14 assumes a position in front of the occupant's knees and it is strained by the pretension device 17 with a predetermined tension. The belt 16 is provided with two longitudinally extensible folds 18 and 20. The folds are longitudinally spaced equidistant on the opposite sides from the impact receiving zone 14 as best seen in FIG. 7.

The belt 16 is further provided with an additional longitudinally extensible fold 26 in addition to the two folds 18 and 20. The additional longitudinally extensible fold 26 has three superposed layers which are interconnected by stitches which are more easily breakable than the stitches of the folds 18 and 20 and it is disposed in a position on the belt 16 between the impact receiving zone 14 and the fold 20 which is adjacent a fixed portion on the tunnel projection nearer to an obstacle 28 than the other fixed portion. Thus during frontal collision of the vehicle the additional longitudinally extensible fold 26 unfolds before the folds 18 and 20 and thereafter the folds 18 and 20 unfold so that the impact receiving zone 14 of the elongated belt 16 assumes the position shown in dash and dot lines 24'. It will therefore be understood that the knees of vehicle occupant will be prevented from hitting against the obstacle 28.

Referring to FIG. 9, the operation of the additional extensible fold 26 in comparison with the two extensible folds 18 and 20 of the knee protector shown in FIGS. 7 and 8 will be further described.

In the diagram shown in FIG. 9, the reference character R represents a fixed portion of the belt on the side panel, S an opposite fixed portion on the tunnel projection, $P_0$ a position of the left knee of the occupant on the belt, $Q_0$ a position of the right knee of the occupant on the belt, and L is a fully extended length of the extensible fold. In FIG. 9, the obstacle 28 is located right forwardly of the elongated belt 16 as viewed by an occupant. When an impact force is applied by the occupant on positions $P_0$ and $Q_0$ on the elongated belt 16 during a vehicle frontal collision, the stitches interconnecting the superposed layers of the additional longitudinally extensible fold 26 will break thereby to absorb a portion of the impact energy before the stitches interconnecting the superposed layers of the two longitudinally extensible folds 18 and 20 will commence to break. When the additional extensible fold 26 has unfolded by breaking its stitches, the stitches of the two folds 18 and 20 are not yet broken. The length of the belt 16 is thus increased to a length expressed by $\overline{RS}$ + L, where $\overline{RS}$ is the initial length of the belt 16 and the position of the belt 16 is designated by R, $P_1$, $Q_1$ and S.

The positions of the legs when the additional fold 26 unfolds fully and the two folds 18 and 20 do not commence to unfold will now be considered. If the point of action on the belt 16 by the occupant's left leg is designated by the reference character $P_0$ and the point of action by the occupant's right leg is designated by the reference character $Q_0$, then these points will assume the positions respectively designated at $P_1$ and $Q_1$ when the additional fold 26 has fully unfolded and the folds 18 and 20 do not commence to unfold. If the material forming the elongated belt 16 does not increase its length and there is no sliding movement of the legs on the belt 16 during a vehicle frontal collision, $\overline{RP_0} = \overline{RP_1}$ will hold. During the vehicle frontal collision, since the legs stretch the belt 16, $\overline{RP_1}$ is straight. It will therefore be understood that the point $P_1$ has to assume its location forwardly of the point $P_0$ and on a circle having its center at the point R and its radius $\overline{RP_0}$. Thus it will now be recognized that the left leg is urged to move leftwardly by $\overline{P_0P_1'}$ where the point $P_1'$ is a projected view of the point $P_1$ on the line RS. The displacement of the right leg upon the extension of the additional fold 26 will now be considered. The position of the right leg will be forwardly of the point $Q_0$ and on a circle having its center at the point S and its radius $\overline{SQ_0} + L$. It will soon be understood that the right leg is urged to move leftwardly by $\overline{Q_0Q_1'}$ where the point $Q_1'$ is a projected view of the point $Q_1$ on the line RS.

The remaining portion of the impact force will be absorbed by breaking of the stitches interconnecting the superposed layers of the folds 18 and 20 and since each of the fold provides a length $\overline{M}$ when it unfolds, the legs assume the positions designated at $P_2$ and $Q_2$ after the full extension of the folds 18 and 20.

In the modification shown in FIGS. 10 and 11 two elongated belts 16' and 16" which are relatively narrow in width as compared to the belt 16 are used. The belts 16' and 16" are anchored in the similar manner to the preceding embodiments and arranged one above the other. Preferably the belts extend substantially parallel to each other and carry at their impact receiving zones two paddings 30 and 32 spaced longitudinally from each other.

The padding is constructed of a rigid plate, such as a metal plate or plastic plate, on that side which is anchored to the belts and of a soft material on opposite side against which the knees of an occupant will hit. Due to the rigid plate the force applied to the padding by the knees during the collision of the vehicle splits into the two belts.

What is claimed is:

1. In a motor vehicle having a seat, a knee protector comprising, in combination:
   A. an elongated belt having one end fixed to a first portion of said vehicle disposed forwardly of said seat;
   B. a device fixed to a second portion of said vehicle disposed forwardly of said seat and spaced laterally, with respect to the longitudinal direction of the vehicle, from said first portion of said vehicle, said device anchoring the other end of said elongated belt to apply a predetermined tension to said elongated belt;
   C. a zone, on said elongated belt, which is adapted to receive an impact force by knees of an occupant of said seat during frontal collision of the vehicle, said elongated belt being provided with two longitudinally extensible folds, each said fold having superposed layers which are interconnected by breakable stitches, said two longitudinally extensible folds being disposed on the longitudinally opposite sides of said zone; and
   D. a lateral movement control means for directing said zone laterally during said frontal collision, comprising at least one second longitudinally extensible fold having superposed layers which are interconnected by stitches which are more easily breakable than those interconnecting said superposed layers of each said two first longitudinally extensible folds, said at least one second longitudinally extensible fold being disposed on one of said longitudinally opposite sides from said zone that is nearer to an obstacle attached to said vehicle and disposed forwardly of said elongated belt.

2. A knee protector as claimed in claim 1, comprising two of said elongated belts, arranged one above the other, and at least one padding covering said zones on said two elongated belts and interconnecting said two elongated belts.

3. A knee protector as claimed in claim 1, comprising two of said elongated belts, arranged one above the other, and at least one padding covering said zones on said two elongated belts and interconnecting said two elongated belts.

4. A knee protector as claimed in claim 3, wherein said one of said longitudinally opposite sides is the right side, whereby forward movement of said knees during said frontal collision is controlled to provide a leftward component for said movement.

5. In a motor vehicle having an interior side panel, a tunnel projection and a seat, a knee protector comprising, in combination:
   A. an elongated belt having one end fixed to a first portion of said vehicle disposed forwardly of said seat, said first portion being disposed on said interior side panel;
   B. a device fixed to a second portion of said vehicle disposed forwardly of said seat and spaced laterally, with respect to the longitudinal direction of the vehicle, from said first portion, said second portion being disposed on said tunnel projection, said device anchoring the other end of said elongated belt to apply a predetermined tension to said elongated belt;
   C. a zone, on said elongated belt, which is adapted to receive an impact force by knees of an occupant of said seat during frontal collision of the said vehicle, and which is spaced from said knees with respect to the longitudinal direction of said vehicle during normal use of said vehicle, said elongated belt being provided with two longitudinally extensible folds, each having superposed layers which are interconnected by breakable stitches, said two longitudinally extensible folds being disposed on the longitudinally opposite sides from said zone; and
   D. a lateral control means for laterally deflecting the direction of movement of said knees from the forward longitudinal direction of said vehicle during said frontal collision of said vehicle.

6. A knee protector as claimed in claim 5, comprising two of said elongated belts; arranged one above the other, and at least one padding covering said zones on said two elongated belts and interconnecting said two elongated belts.

7. In a motor vehicle having a seat, a knee protector comprising, in combination:
   A. an elongated belt having one end fixed to a first portion of said vehicle which is disposed forwardly of said seat;
   B. a device fixed to a second portion of said vehicle, disposed forwardly of said seat and spaced laterally, with respect to the longitudinal direction of the vehicle, from said first portion, said device anchoring the other end of said elongated belt to apply a predetermined tension to said elongated belt;
   C. an impact receiving zone, on said elongated belt, which is adapted to receive an impact force by knees of an occupant of said seat during frontal collision of the vehicle, said elongated belt being provided with two longitudinally extensible folds, each having superposed layers which are interconnected by breakable stitches, said two longitudinally extensible folds being disposed on the longitudinally opposite sides from said zone;

D. a padding anchored to said elongated belt to cover said zone; and

E. a second longitudinally extensible fold having superposed layers which are interconnected by breakable stitches, which are more easily breakable than said breakable stitches of said first folds, said second fold being disposed in a position between said impact receiving zone and one of said two first longitudinally extensible folds, such that upon application of said impact force by said knees of said occupant during said frontal collision of said vehicle on said impact receiving zone, said second fold unfolds before said two longitudinally extensible folds unfold to deflect a direction of movement of said knees from the forward longitudinal direction of said vehicle.

8. In a motor vehicle having an interior side panel, a tunnel projection and a seat, a knee protector comprising, in combination:

A. an elongated belt having one end fixed to a first portion of said vehicle which is disposed forwardly of said seat, said first portion being disposed on said interior side panel, comprising:

1. a zone, on said elongated belt, which is adapted to receive an impact force by knees of an occupant of said seat during frontal collision of the vehicle, and which is separated from said knees with respect to the longitudinal direction of said vehicle by a movement space, said elongated belt being provided with two first longitudinally extensible folds, each having superposed layers which are interconnected by breakable stitches, said two first longitudinally extensible folds being disposed on the longitudinally opposite sides from said zone, and 2. at least one second longitudinally extensible fold having superposed layers which are interconnected by stitches which are more easily breakable than those interconnecting the superposed layers of each of said first longitudinally extensible folds, said at least one second longitudinally extensible fold being disposed on the right side of said zone, whereby said knees move through said movement space during said frontal collision, contact said zone, and then move leftwardly while breaking said stitches which are more easily breakable to absorb a portion of the impact energy of said occupant; and B. a device fixed to a second portion of said vehicle which is disposed forwardly of said seat and spaced laterally, with respect to the longitudinal direction of the vehicle, from said first portion, said second portion being disposed on said tunnel projection, said device anchoring the other end of said elongated belt to apply a predetermined tension to said elongated belt.

9. The knee protector of claim 8, wherein said knees move further forwardly during said frontal collision while breaking said breakable stitches in said two first longitudinally extensible folds to absorb an additional portion of the impact energy of said occupant.

* * * * *